(12) United States Patent
Wilson

(10) Patent No.: US 10,552,865 B2
(45) Date of Patent: Feb. 4, 2020

(54) SYSTEM AND METHOD FOR SEGMENTING AND TARGETING AUDIENCE MEMBERS

(75) Inventor: Joseph G. Wilson, Mamaroneck, NY (US)

(73) Assignee: Oath (Americas) Inc., Dulles, VA (US)

( * ) Notice: Subject to any disclaimer, the term of this patent is extended or adjusted under 35 U.S.C. 154(b) by 340 days.

(21) Appl. No.: 12/882,905

(22) Filed: Sep. 15, 2010

(65) Prior Publication Data

US 2011/0066705 A1    Mar. 17, 2011

Related U.S. Application Data

(62) Division of application No. 10/669,791, filed on Sep. 25, 2003, now Pat. No. 7,805,332.

(60) Provisional application No. 60/491,521, filed on Aug. 1, 2003.

(51) Int. Cl.
G06Q 30/00     (2012.01)
G06Q 30/02     (2012.01)

(52) U.S. Cl.
CPC ..... *G06Q 30/0251* (2013.01); *G06Q 30/0255* (2013.01); *G06Q 30/0269* (2013.01)

(58) Field of Classification Search
CPC .................................................. G06Q 30/0251
USPC .......................................................... 705/14
See application file for complete search history.

(56) References Cited

U.S. PATENT DOCUMENTS 5,675,510 A    10/1997    Coffee et al.
5,796,952 A    8/1998     Davis et al.
5,848,396 A    12/1998    Gerace
5,855,008 A    12/1998    Goldhaber et al.
5,948,061 A *  9/1999     Merriman et al. ............ 709/219
(Continued)

FOREIGN PATENT DOCUMENTS

JP    2001-175761 A    6/2001
JP    2002-092284 A    3/2002
(Continued)

OTHER PUBLICATIONS

Spencer-Wendel, Susan, "Phone, Cable Firms Fight for 'Last Mile,'" Palm Beach Post, Jun. 13, 1999, p. 1.A.
(Continued)

*Primary Examiner* — Matthew L Hamilton
(74) *Attorney, Agent, or Firm* — Bookoff McAndrews, PLLC

(57) ABSTRACT

Methods and apparatus for delivering content to an audience member via one or more mediums based on an audience member profile are disclosed. Profile data for audience members may be initially collected from an offline source, such as a registration or subscription database. The profile data may be stored in a dedicated database. The initial profile data may be supplemented periodically with data reflecting online activity by the audience member. The combined offline and online profile data may be used to group the audience members into segments. Audience member segments may be used to identify audience members who are targeted to receive like content. An audience member's inclusion in a segment may be indicated by storing a segment-targeting cookie on the audience member computer. Content may be delivered to the audience member based on identification of the segment in the segment-targeting cookie.

20 Claims, 7 Drawing Sheets

(56) References Cited

U.S. PATENT DOCUMENTS

| | | | |
|---|---|---|---|
| 6,044,376 A | 3/2000 | Kurtzman, II | |
| 6,055,573 A | 4/2000 | Gardenswartz et al. | |
| 6,073,241 A * | 6/2000 | Rosenberg et al. | 726/3 |
| 6,078,866 A | 6/2000 | Buck et al. | |
| 6,108,637 A | 8/2000 | Bluemenau | |
| 6,108,645 A | 8/2000 | Eichstaedt et al. | |
| 6,115,680 A | 9/2000 | Coffee et al. | |
| 6,138,115 A | 10/2000 | Agrawal et al. | |
| 6,144,944 A | 11/2000 | Kurtzman et al. | |
| 6,154,783 A | 11/2000 | Gilmour et al. | |
| 6,177,931 B1 | 1/2001 | Alexander et al. | |
| 6,237,033 B1 | 5/2001 | Doeberl et al. | |
| 6,269,361 B1 | 7/2001 | Davis et al. | |
| 6,298,330 B1 | 10/2001 | Gardenswartz et al. | |
| 6,324,519 B1 | 11/2001 | Eldering | |
| 6,330,566 B1 | 12/2001 | Durham | |
| 6,385,619 B1 | 5/2002 | Eichstaedt et al. | |
| 6,421,729 B1 * | 7/2002 | Paltenghe et al. | 709/229 |
| 6,477,575 B1 | 11/2002 | Koeppel et al. | |
| 6,487,390 B1 | 11/2002 | Virine et al. | |
| 6,526,406 B1 | 2/2003 | Suzuki et al. | |
| 6,560,578 B2 | 5/2003 | Eldering | |
| 6,563,514 B1 | 5/2003 | Samar | |
| 6,604,138 B1 | 8/2003 | Virine et al. | |
| 6,606,745 B2 | 8/2003 | Maggio | |
| 6,611,839 B1 | 8/2003 | Nwabueze | |
| 6,611,842 B1 | 8/2003 | Brown | |
| 6,643,635 B2 | 11/2003 | Nwabueze | |
| 6,643,696 B2 | 11/2003 | Davis et al. | |
| 6,658,410 B1 | 12/2003 | Sakamaki et al. | |
| 6,665,837 B1 | 12/2003 | Dean et al. | |
| 6,698,020 B1 | 2/2004 | Zigmond et al. | |
| 6,704,727 B1 | 3/2004 | Kravets | |
| 6,807,558 B1 | 10/2004 | Hassett et al. | |
| 6,832,207 B1 | 12/2004 | Shkedi | |
| 6,871,196 B1 | 3/2005 | Chan et al. | |
| 6,873,981 B2 | 3/2005 | Nareddy et al. | |
| 6,917,972 B1 | 7/2005 | Basko et al. | |
| 6,993,529 B1 | 1/2006 | Basko et al. | |
| 7,039,699 B1 | 5/2006 | Narin et al. | |
| 7,260,783 B1 | 8/2007 | Mika | |
| 7,328,448 B2 | 2/2008 | Eldering et al. | |
| 2001/0039515 A1 | 11/2001 | Mayadas | |
| 2001/0042064 A1 | 11/2001 | Davis et al. | |
| 2001/0047354 A1 | 11/2001 | Davis et al. | |
| 2001/0051940 A1 | 12/2001 | Soulanille | |
| 2002/0002445 A1 | 1/2002 | Doliov | |
| 2002/0010757 A1 | 1/2002 | Granik et al. | |
| 2002/0026360 A1 | 2/2002 | McGregor et al. | |
| 2002/0053078 A1 | 5/2002 | Holtz et al. | |
| 2002/0069105 A1 | 6/2002 | do Rosario Botelho et al. | |
| 2002/0087920 A1 | 7/2002 | Gallo et al. | |
| 2002/0087980 A1 | 7/2002 | Eldering et al. | |
| 2002/0099602 A1 | 7/2002 | Moskowitz et al. | |
| 2002/0103698 A1 | 8/2002 | Cantrell | |
| 2002/0124182 A1 | 9/2002 | Basco et al. | |
| 2002/0126827 A1 * | 9/2002 | Pelletier et al. | 379/230 |
| 2002/0156781 A1 | 10/2002 | Cordray et al. | |
| 2002/0165849 A1 | 11/2002 | Singh et al. | |
| 2002/0166119 A1 * | 11/2002 | Cristofalo | 725/34 |
| 2002/0166127 A1 * | 11/2002 | Hamano et al. | 725/105 |
| 2002/0169760 A1 | 11/2002 | Cheung et al. | |
| 2003/0028529 A1 | 2/2003 | Cheung et al. | |
| 2003/0033292 A1 | 2/2003 | Meisel et al. | |
| 2003/0055816 A1 | 3/2003 | Paine et al. | |
| 2003/0083938 A1 * | 5/2003 | Smith et al. | 705/14 |
| 2003/0093285 A1 | 5/2003 | Colace et al. | |
| 2003/0135853 A1 * | 7/2003 | Goldman et al. | 725/34 |
| 2003/0146940 A1 | 8/2003 | Ellis et al. | |
| 2003/0149937 A1 | 8/2003 | McElfresh et al. | |
| 2003/0208474 A1 | 11/2003 | Soulanille et al. | |
| 2003/0212648 A1 | 11/2003 | Cunningham et al. | |
| 2003/0220830 A1 | 11/2003 | Myr | |
| 2003/0220912 A1 | 11/2003 | Fain et al. | |
| 2003/0236879 A1 * | 12/2003 | Moritani et al. | 709/224 |
| 2004/0039733 A1 | 2/2004 | Soulanille | |
| 2004/0054661 A1 | 3/2004 | Cheung et al. | |
| 2004/0054784 A1 * | 3/2004 | Busch et al. | 709/228 |
| 2004/0073538 A1 | 4/2004 | Leishman et al. | |
| 2004/0103051 A1 * | 5/2004 | Reed et al. | 705/36 |
| 2004/0143843 A1 | 7/2004 | Khoo et al. | |
| 2004/0163101 A1 | 8/2004 | Swix et al. | |
| 2005/0119939 A1 * | 6/2005 | Henning et al. | 705/14 |
| 2007/0233571 A1 * | 10/2007 | Eldering et al. | 705/14 |
| 2010/0100435 A1 * | 4/2010 | Matz et al. | 705/14.45 |

FOREIGN PATENT DOCUMENTS

| | | |
|---|---|---|
| JP | 2006-522011 | 9/2006 |
| WO | WO 1999/060503 A1 | 11/1999 |
| WO | WO 2001/022261 A2 | 3/2001 |
| WO | WO 2001/054034 A1 | 7/2001 |
| WO | WO 2001/090956 A1 | 11/2001 |
| WO | WO 2002/013112 A1 | 2/2002 |
| WO | WO 2002/065331 A2 | 8/2002 |
| WO | WO 2002/102030 A2 | 12/2002 |
| WO | WO 2003/023680 A1 | 3/2003 |

OTHER PUBLICATIONS

Japanese Patent Office, "Examples of Business-Related Inventions which are not Allowable as a Patent," Apr. 2001, http://www.jpo.go.jp/tetuzuki/t_tokkyo/bijinesu/tt1303-090_jirei.htm, Machine-translation attached.

C.J., "An Introduction to Database Systems, Chapter 14: Semantic Modeling," Addison-Wesley Long Publishing Co., Inc., vol. 1, 8th Ed., 2004, pp. 409-441.

Ramesh, C., "Managing cookies," Businessline, Jun. 25, 2003, p. 1.

The U.S. Department of Energy Computer Incident Advisory Capability, Information Bulletin, "Internet Cookies," Mar. 12, 1998, pp. 1-9.

"1-800 Flowers.com Homepage," Internet Archives Way Back Machine, Feb. 24, 2001, Retrieved on Jul. 25, 2006, Retrieved from the Internet: <URL:http://archive.bibalex.org/web/20010309083458/1800flowers.com/flowers/welcome.asp>.

Official Journal EPO, "Notice from the European Patent Office dated Oct. 1, 2007 concerning business methods," Nov. 1, 2007, pp. 592-593.

* cited by examiner

SYSTEM AND METHOD FOR SEGMENTING AND TARGETING AUDIENCE MEMBERS

CROSS-REFERENCE TO RELATED APPLICATION

This application is a divisional of, relates to, and claims the benefit of the earlier filing date and priority of U.S. patent application Ser. No. 10/669,791, filed Sep. 25, 2003, and entitled "System and Method for Segmenting and Targeting Audience Members," which application relates to, and claims the benefit of the earlier filing date and priority of, U.S. Provisional Patent Application No. 60/491,521, filed on Aug. 1, 2003, and entitled "System and Method for Segmenting and Targeting Audience Members," a copy of which is incorporated herein by reference in its entirety.

FIELD OF THE INVENTION

The present invention relates to a system and method for targeting the delivery of content to selected audience members based on the integration of diverse data into profile data relating to the selected audience members. The present invention may have particular use for the delivery of content to selected audience members using the Internet, although the invention is not limited to delivery of content via this means.

BACKGROUND OF THE INVENTION

Targeted marketing has long been known as an effective method for reaching consumers. When the consumer receives only relevant content (advertisements, etc.) from a provider, the consumer is more likely to patronize the particular provider, make purchases, and provide additional personal information that may assist in refining the provider's "view" of the consumer. As such, targeted marketing can lead to a more focused and robust interaction with the consumer. This, correspondingly, can lead to a more rewarding interaction for the provider by generating increased revenue.

In order to effectively target a consumer, it may be desirable for marketing systems to react to consumer information received from a variety of online and offline sources. These sources may include databases and servers, as well as multiple web properties within a network of affiliated websites. Moreover, the consumer information may be collected from a variety of sources in diverse formats. It may also be desirable for marketing systems to interact with the systems that actually deliver the content to the user. In short, an effective marketing system may appreciate the characteristics and preferences of a specific user regardless of the number or type of channels through which contact with the user is made.

Some known systems, however, are only adapted to receive information from a single source (e.g., registration information provided by the consumer). Other systems may receive information from multiple sources, but are unable to usefully combine information relating to the same consumer and communicate it to the necessary content delivery system. Thus, it may be desirable to have a system and method for delivering content that integrates with and aggregates data from various sources, including the underlying systems that deliver content to the consumer.

Known systems for delivering targeted content to consumers are focused on reaching the greatest quantity of consumers, without considering the value of interacting with each particular consumer. For example, some systems may deliver "targeted" content to each member of a group of consumers based on the fact that each subscribes to the same magazine. These systems, however, do not consider that only a portion of the group may make on-line purchases, for example, in addition to subscribing to the magazine. This failure to recognize and differentiate "valuable" consumers can lead to lost revenue for the content provider. In addition, the delivery of content to a significant volume of low-value consumers may expend valuable system resources. Accordingly, it may be desirable to have a means of delivering the appropriate content to the appropriate user in order to maximize the value of the relationship between the provider and the consumer.

In at least some embodiments, the system and method of the present invention may provide significant advantages over known marketing systems. Some, but not necessarily all, embodiments of the present invention may provide a useful system and method for targeting the delivery of content to selected consumers. It is an advantage of some embodiments of the present invention to efficiently collect and integrate consumer data from a variety of online and offline sources. It is an additional advantage of some embodiments of the present invention to effectively deliver content to high-value consumers. Additional advantages of various embodiments of the invention are set forth, in part, in the description that follows and, in part, will be apparent to one of ordinary skill in the art from the description and/or from the practice of the invention.

SUMMARY OF THE INVENTION

Responsive to the foregoing challenges, Applicant has developed an innovative method of delivering content to an audience member over a plurality of digital mediums based on an audience member profile. The method may comprise the steps of: providing the audience member access to first and second digital mediums; providing an audience member profile common to both the first and second digital mediums; associating the audience member with a segment of audience members based on the audience member profile; and delivering content to the audience member via the first and second digital mediums based on the association of the audience member with the segment of audience members.

Applicant has further developed an innovative method of delivering content to an audience member based on an audience member comprising the steps of: receiving a request for a first website page from the audience member; storing a cookie associated with the first website page in a computer associated with the audience member; identifying a unique identifier for the audience member in the cookie; associating the audience member with profile data based on the unique identifier; associating the audience member with a segment of audience members based on the profile data; and delivering content to the audience member based on the association of the audience member with the segment of audience members.

Applicants have further developed an innovative method of delivering content to an audience member based on profile data, comprising the steps of: storing audience member profile data in a database; associating the audience member with a segment of audience members based on the profile data; identifying the segment of audience members with a segment identifier included in a segment-targeting cookie; storing the segment-targeting cookie on a computer associated with the audience member; and delivering content to the audience member based on the segment identifier.

It is to be understood that both the foregoing general description and the following detailed description are exemplary and explanatory only, and are not restrictive of the invention as claimed.

BRIEF DESCRIPTION OF THE DRAWINGS

In order to assist the understanding of this invention, reference will now be made to the appended drawings, in which like reference characters refer to like elements.

DETAILED DESCRIPTION OF EMBODIMENTS
OF THE INVENTION

Figure 1:
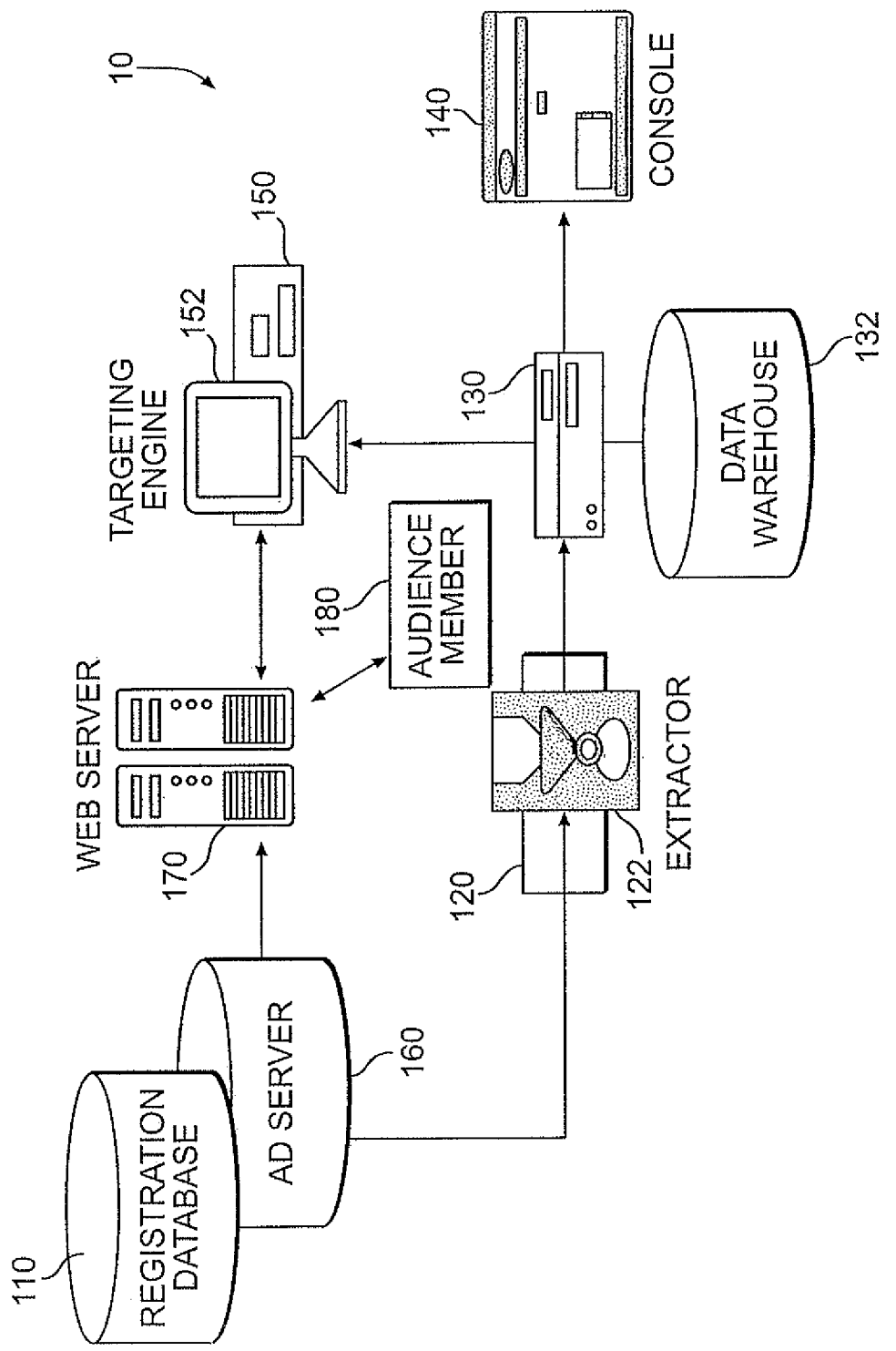
FIG. 1 is an exemplary block diagram of the system architecture in accordance with a first embodiment of the present invention.

One embodiment of the system 10 for carrying out a method embodiment of the present invention is shown in FIG. 1. The system 10 includes a first server 120 which hosts an extractor program 122. The first server 120 is operatively connected to one or more offline databases 110, and one or more external content servers 160. The offline databases 110 and external content servers 160 are also operatively connected to one or more web servers 170. The web servers 170 may provide website pages to an audience member computer 180 in a conventional manner. The web servers 170 are also operatively connected to a targeting engine program 152 resident on a second server 150. The first and second servers 120 and 150 may be operatively connected to a third server 130 which contains a database 132 (referred to as the data warehouse) for storing audience member profile data. In some embodiments of the present invention, the same server may act as the first, second, and/or third servers 120, 150, and 130. A control console 140 may be operatively connected to the third server 130.

Figure 2:
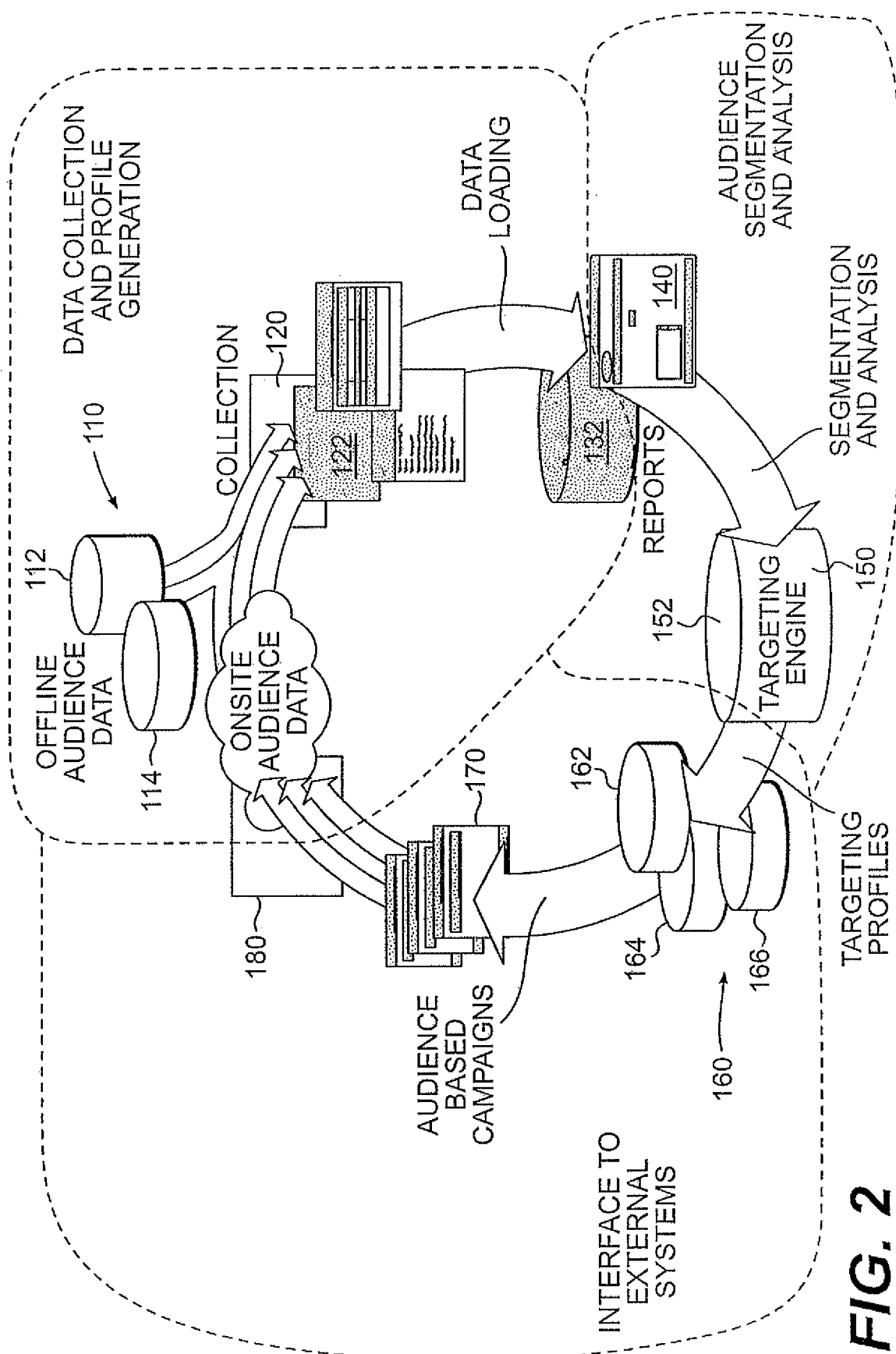
FIG. 2 is an exemplary flow diagram of the steps performed in accordance with the first embodiment of the present invention.

Reference will now be made in detail to the steps performed in accordance with a first embodiment of the present invention, an example of which is illustrated in FIG. 2. With reference to FIG. 2, a first method embodiment of the present invention may include three primary stages: data collection and profile generation; audience segmentation and analysis; and interface to external systems. During data collection and profile generation, offline data sources 110 are searched to collect profile data relating to individuals (referred to as audience members). This profile data is stored in the data warehouse 132. During audience segmentation and analysis, the profile data for audience members is used to categorize the audience members into segments. For example, profile data may indicate that a particular audience member subscribes to Golf Magazine, and thus has some interest in golf. That audience member may then be included in a segment (i.e., group) of audience members that are also interested in golf. During the interface to external systems stage, a targeting engine 152 may use the inclusion of the audience member in a segment to direct targeted external content to the audience members in that segment. Continuing with the example posed above, audience members in the "golf" segment may have golf related content sent to them as a result.

With continued reference to FIG. 2, data collection and profile generation may involve the offline databases 110, the extractor program 122, and the data warehouse 132. Initial profile information about individual audience members may be collected from available databases, such as a registration database 112 and a subscription database 114 by the extractor 122. Registration and subscription databases 112 and 114 may include audience member profile data collected as a result of the audience member registering with, or subscribing to, any type of service, including but not limited to an Internet, magazine, newspaper, newsletter, cable, telephone, or wireless service, for example. These registration and subscription databases may include a wide variety of profile information such as name, gender, age, birth date, home and work addresses, telephone numbers, credit and charge card information, marital status, income level, number and age of children, employment history, hobbies, recent purchases, educational status, interests, preferences, and the like, for example.

The extractor 122 is a program that is used to parse and identify audience member profile data from within a set of data. The extractor 122 may be constructed using Java, Perl, C++, C#, SQL, or any other similar programming language. The extractor 122 may be resident on a server 120, or multiple servers. The extractor 122 may be governed by a set of extraction rules that determine the source(s) and format(s) of profile data that may be used to create a profile for an audience member, and the categories of profile data to be collected. The extraction rules may include a series of text rules (using matching utilities such as string matching or regular expressions) that are used to transform data in one form into a more standardized form while removing unneeded data. The extraction rules may include, for example, a statement such as "if string contains 'A' then output result 'B'."

The extractor 122 is operatively connected to a database 132 referred to as the data warehouse 132. The data warehouse 132 may be provided on a second server 130, and may be used to store the profile and segment affinity data relating to audience members. The extractor 122 may routinely update the profile and segment affinity data in the data warehouse 132. As new or modified profile data becomes available from the offline databases 110, the extractor 122 may modify the profile data for an audience member. The extractor 122 may also receive profile data directly from the audience member computer 180 and/or the targeting engine 152 that indicates the website pages visited, the web searches conducted, and the emails received by the audience member.

Figure 3:
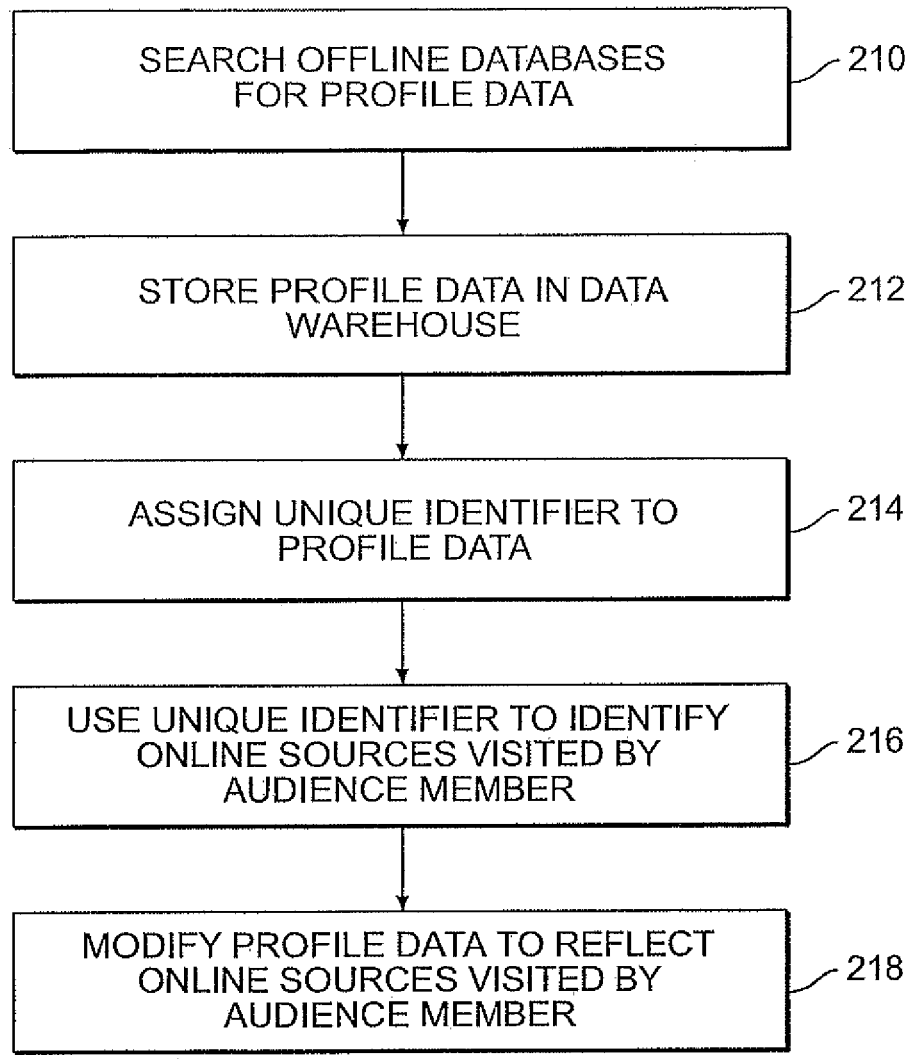
FIG. 3 is an exemplary flow diagram of the steps performed to generate audience member profiles in accordance with the first embodiment of the present invention.

FIG. 3 is an exemplary flow diagram of the steps performed to generate audience member profiles in accordance with the first embodiment of the present invention. The steps shown in FIG. 3 show the manner in which the extractor 122 obtains profile data indicating the online website pages visited by an audience member. In step 210 the extractor searches the offline databases, such as registration and subscription databases, for profile data relating to individual audience members. The search of the offline databases may be initiated by an instruction received from the console 140. For example, an instruction could be given to collect profile data for all audience members who subscribe to the New York Times. Such an instruction necessitates that the extractor 122 have access to the subscription database for the New York Times.

The extraction rules determine the profile data that is collected. In step 212, the profile data extracted from the offline sources may be stored in the data warehouse. As there may be a need to determine the profile data that is associated with a particular audience member, the extractor may assign a unique identifier to the profile data in step 214. The unique identifier may be a string of numeric, alphabetic, alphanumeric, or other characters that may be used to identify one audience member.

In step 216, the unique identifier may be used to identify content visited by the audience member. The unique identifier may be so used by including it in a domain cookie associated with each website page visited by the audience member. Each of these domain cookies may be stored on the computer associated with the audience member, and may be used to identify each particular website page visited by the audience member as being associated with the unique identifier. In step 218, the extractor may determine the domain cookies that are stored on the audience member's computer. Because these domain cookies include the unique identifier that identifies the particular audience member, the extractor may use these cookies to modify the profile data for a particular audience member to reflect that the audience member visited the website pages associated with the cookies. By combining the profile data obtained from the offline databases with the profile data updates that occur as a result of the audience member visiting website pages, a complete set of profile data may be collected for an audience member, reflecting both offline and online behavior and characteristics for the audience member.

Tracking the online history of an audience member requires that the system be able to uniquely identify audience members. This tracking may be accomplished by combining a unique identifier for each audience member with website pages in the network that the audience member has visited.

Figure 4:
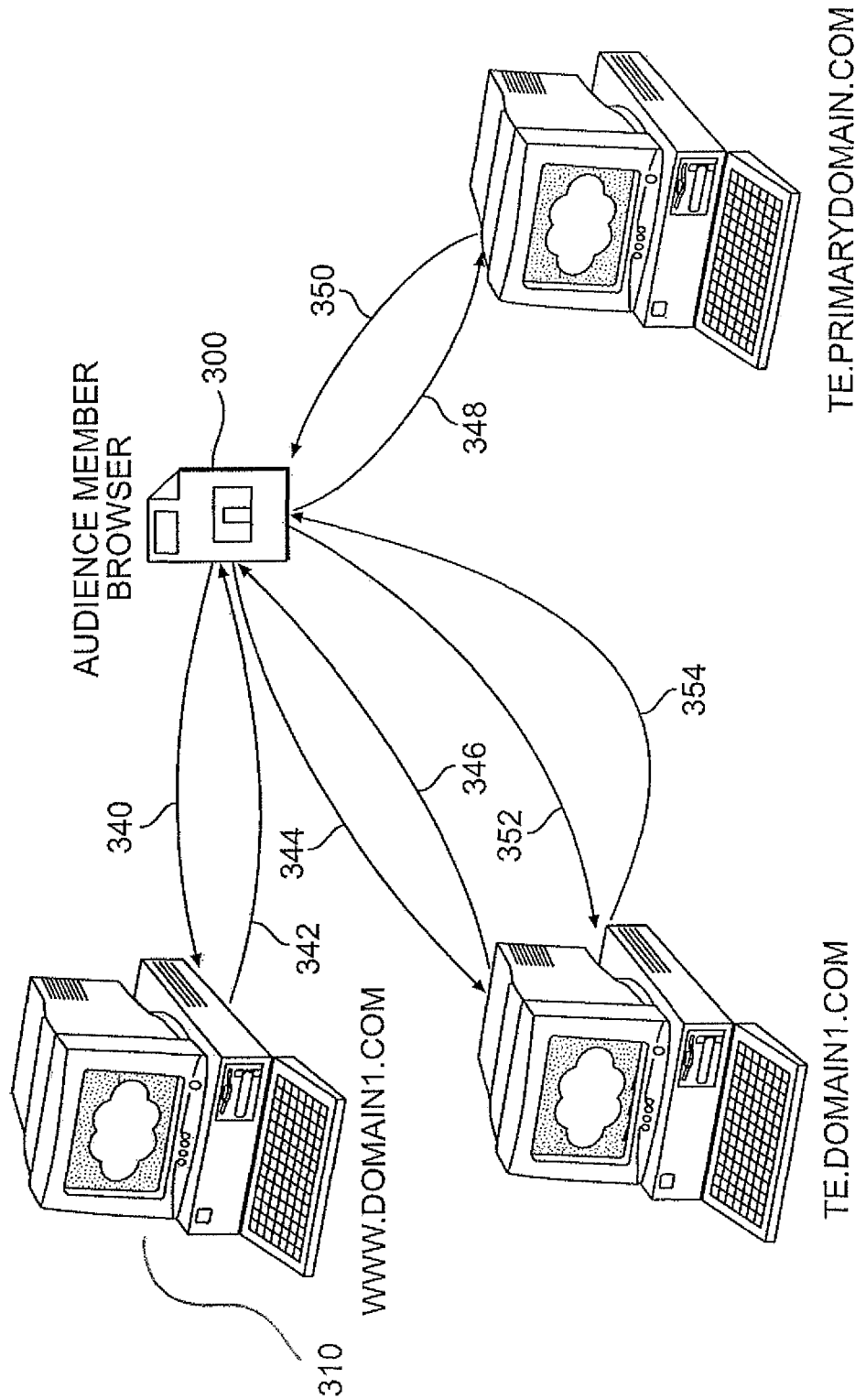
FIG. 4 is an exemplary flow diagram of the steps performed to track website pages visited by an audience member using a unique identifier in accordance with the first embodiment of the present invention.

A method of providing the unique identifier in each of the domain cookies associated with a number of related website pages is illustrated in FIG. 4. Each of the domain cookies associated with the website pages visited by the audience member may be modified to include the unique identifier by designating one of the related website page domains as the primary website domain. A primary domain cookie with the unique identifier is established for the primary website domain. Usually, a network will already have a domain that can be used for this purpose. If not, one of the domains in the network may be designated as the primary domain.

With reference to FIG. 4, an audience member browser 300 initiates the process in step 340 by requesting a website page from a site within the network, www.domain1.com 310. Responsive to the website page request directed to www.domain1.com 310, a page is returned to the browser 300 with an image tag which may reference the targeting engine 152 at te.domain1.com in step 342. In step 344, an image request is sent from the browser 300 to the targeting engine 152. If a unique identifier is not included in the request, in step 346 a redirect is sent to the browser 300 to the targeting engine 152 now referenced as te.primarydomain.com. The redirect includes a reference to the original targeting engine reference in step 344, te.domain1.com. For example, the redirect may be http://te.primarydomain.com/blank.gif?te.domain1.com. In step 348, the browser 300 may send this redirect request to te.primarydomain.com. Responsive to this request, in step 350 a primarydomain.com cookie containing a unique identifier for the audience member is assigned to the browser 300. In step 352, a second redirect is made of the browser 300 to te.domain1.com, that may include the same unique identifier as set in the primary domain cookie. For example, the redirect may be http://te.domain1.com/blank.gif?tid=7dha6wlk9927sha. In step 354, the redirect request is returned with the originally requested image and a domain1.com cookie with the same unique identifier as the primarydomain.com cookie.

After the process illustrated in FIG. 4 is completed, an audience member visit to another website in the network, such as www.domain2.com, may result in a request for an image at te.domain2.com. If the Targeting Engine 152 does not detect a domain2.com cookie with a unique identifier following the image request, the Targeting Engine 152 may redirect a request to primarydomain.com for a cookie. Responsive to this request to primarydomain.com, the primarydomain.com cookie is read and a redirect is sent back to the browser 300 containing the unique identifier contained in the primary domain.com cookie. The unique identifier in the primarydomain.com cookie is the same as previously set. The requested image may then be sent to the browser 300 along with the domain2.com cookie which may have the same unique identifier as the primarydomain.com cookie. This process of providing a domain cookie with the unique identifier is carried out each time the audience member visits a new website page for the first time so long as the new website is related to the other websites in the network from the viewpoint of the Targeting Engine.

In a preferred embodiment, the Targeting Engine 152 may be a standalone web server, running on Apache, and using a MySQL database on a shared server. It is appreciated that the Targeting Engine 152 may be realized using alternative software and separate servers for Apache and the database. The Targeting Engine 152 may direct the setting of an additional cookie that may contain one or more segment identifiers. These cookies may then be used by other servers, such as, for example, an ad server, an email server, a streaming media server, and/or a web content server, to deliver targeted content to a particular audience member based upon one or more segments in the cookie.

With renewed reference to FIG. 2, the audience segmentation and analysis stage may be carried out by the data warehouse 132. The data warehouse 132 may assign a particular audience member to one or more segments based upon common profile characteristics. A segment of audience members may be defined as a group of audience members to which the system user (such as an advertiser) desires to send the same content. For example, returning to the example discussed above, a segment of audience members may be defined as all audience members that the system user selects to receive a particular golf advertisement. The selection of the audience members for receipt of this advertisement may be based on one or more audience member characteristics in the profile data.

Figure 5:
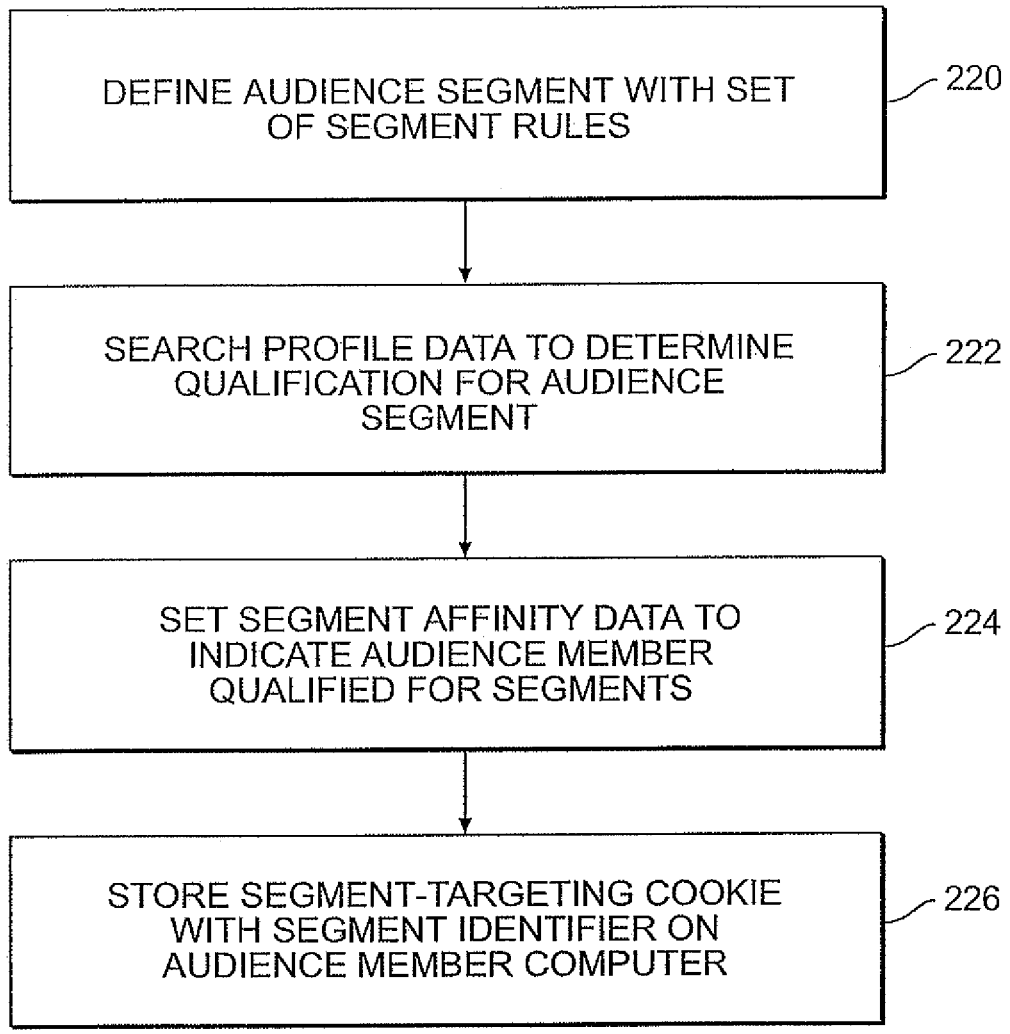
FIG. 5 is an exemplary flow diagram of the steps performed to group audience members into segments for receipt of targeted content.

A method of associating an audience member with a segment is illustrated in FIG. 5. In step 220, the profile data attribute values of audience members who will qualify for inclusion in the segment may be defined by a set of segment rules. The segment rules may be selected using the console 140. Any of number and/or range of profile data attribute values may be used to govern qualification for a segment. In step 222, the data warehouse 132 may search the profile data to determine the audience members that qualify for the audience segment. This search may be carried out at the request of the system user, and if desired, on a routine basis, such as daily. In this manner, membership in the audience segment may be maintained up to date. In step 224, the data warehouse 132 may store segment affinity data to indicate the audience members that are included in a particular segment. It is appreciated that the segment affinity data may indicate that an audience member is in more than one segment. The segment affinity data is defined by a set of rules based upon the behavior and characteristics in the audience profile. Once a set of rules that define the segment affinity data are identified, a segment identifier is assigned to that particular set of rules. This segment identifier is then sent to the Targeting Engine 152, along with the audience unique identifier assigned previously by the Targeting Engine 152. In step 226, when the Targeting Engine 152 is notified that an audience member has requested a website page in the network, the Targeting Engine stores a segment-targeting cookie on the audience member's computer. The segment-targeting cookie includes the segment identifier that identifies the segments that the audience member is included in. The method of storing the segment-targeting cookie on an audience member computer is described in further detail below in connection with FIG. 6.

Profile data for audience members may also be manually analyzed to build segments. With renewed reference to FIG. 2, the server or servers that host the Targeting Engine 152 and the data warehouse 132 may be operatively connected to the console 140. The console 140 may be used to designate the offline databases used to initially populate the data warehouse with profile information, to set the rules for collecting profile information, and to create and view reports showing audience member profile data, audience member segment affinity data, and audience member Internet activity.

Figure 6:
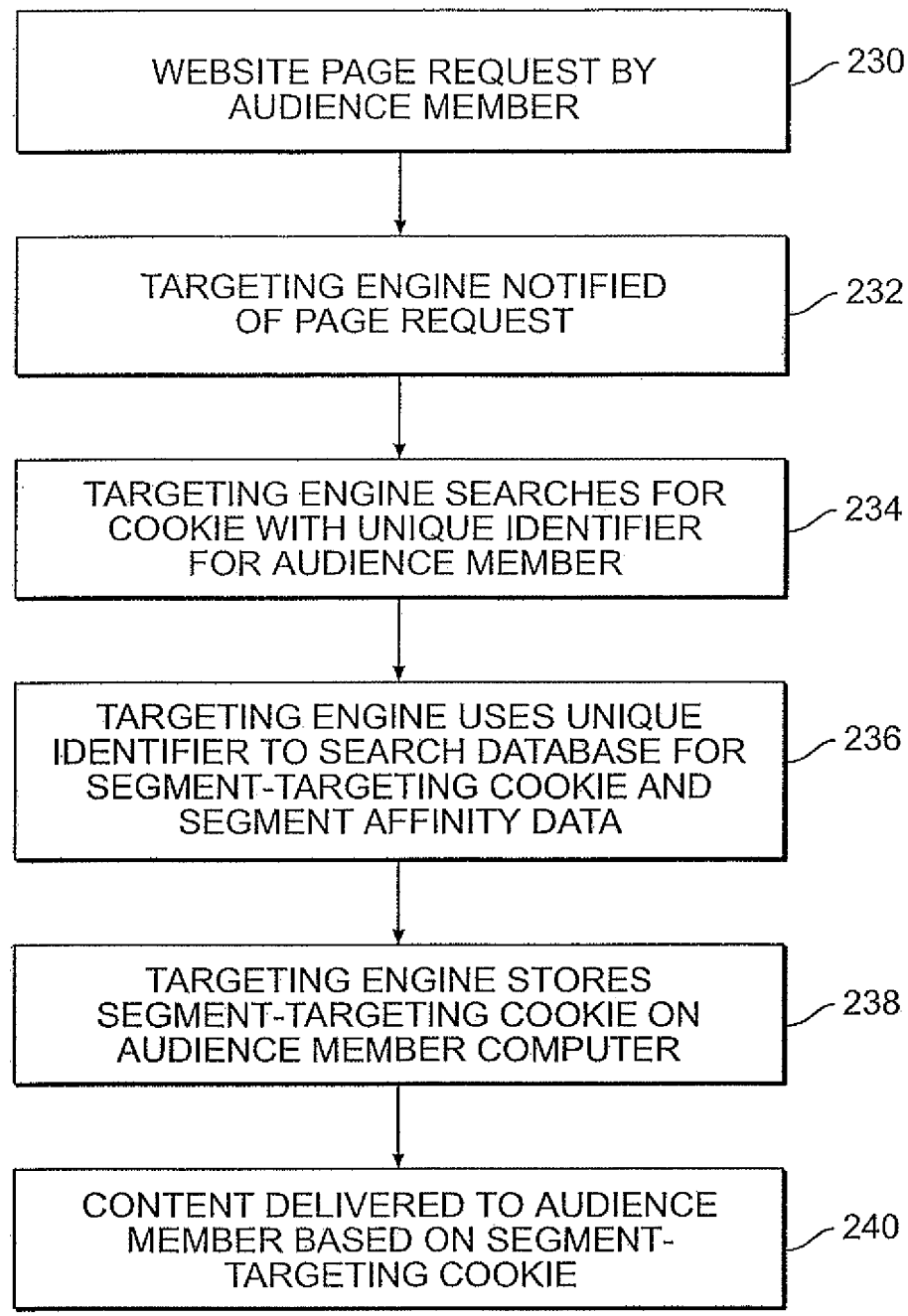
FIG. 6 is an exemplary flow diagram of the steps performed to direct targeted content to audience members in a segment.

A method of delivering targeted content to an audience member based on the segment affinity data is illustrated in FIG. 6. With reference to FIG. 6, an audience member requests a website page in the network of related websites in step 230. The Targeting Engine is notified of the website page request in step 232. Responsive to the audience members request for a website page, in step 234 the Targeting Engine determines whether or not a domain cookie, associated with the requested website page, includes a unique identifier for the audience member. If a unique identifier is not identified, the Targeting Engine will provide a website domain cookie with a unique identifier as described above in connection with FIG. 4. Once a website domain cookie is provided with a unique identifier, in step 236 the Targeting Engine may determine whether or not a segment-targeting cookie is already associated with the audience member in the data warehouse. The segment-targeting cookie may include a segment identifier that indicates the segment(s) to which the audience member belongs. If segment affinity data is stored in the data warehouse for the audience member, then a segment-targeting cookie is created and stored in the audience member computer with the appropriate segment identifier in step 238. In step 240, content may be delivered to the audience member based on the segment identifier in the segment-targeting cookie stored in the audience member computer.

If no segment-targeting cookie is identified in step 236, the Targeting Engine may query the data warehouse for any segment affinity data associated with the audience member. If no segment affinity data is stored for the audience member, a default segment-targeting cookie may be stored in the audience member computer. The default segment-targeting cookie may automatically expire after some fixed period of time, such as one day for example.

Once a segment-targeting cookie is stored on the audience member computer, the Targeting Engine may periodically update it with new segment affinity data for the audience member. Updating may occur automatically at fixed intervals, and/or in response to modifications to the profile data for the audience member.

A wide variety of content may be provided to the audience member as a result of the segment-targeting cookie being stored on the audience member computer. With renewed reference to FIG. 2, content may include, but is not limited to website page advertisements, pop-up advertisements, emails, or the like.

The system 10 of the present invention is adapted to segment and target audience members for delivering content to an audience member across a plurality of digital mediums. The digital mediums may be heterogeneous, and may include, but are not limited to, a website network, a cable system, a non-web based Internet network, a wireless communications system, such as a cellular phone or RF network, and/or any digital medium in which the means for interfacing the audience member with the digital content is uniquely addressable. It is contemplated that the digital medium may include other consumer technologies not yet developed.

Figure 7:
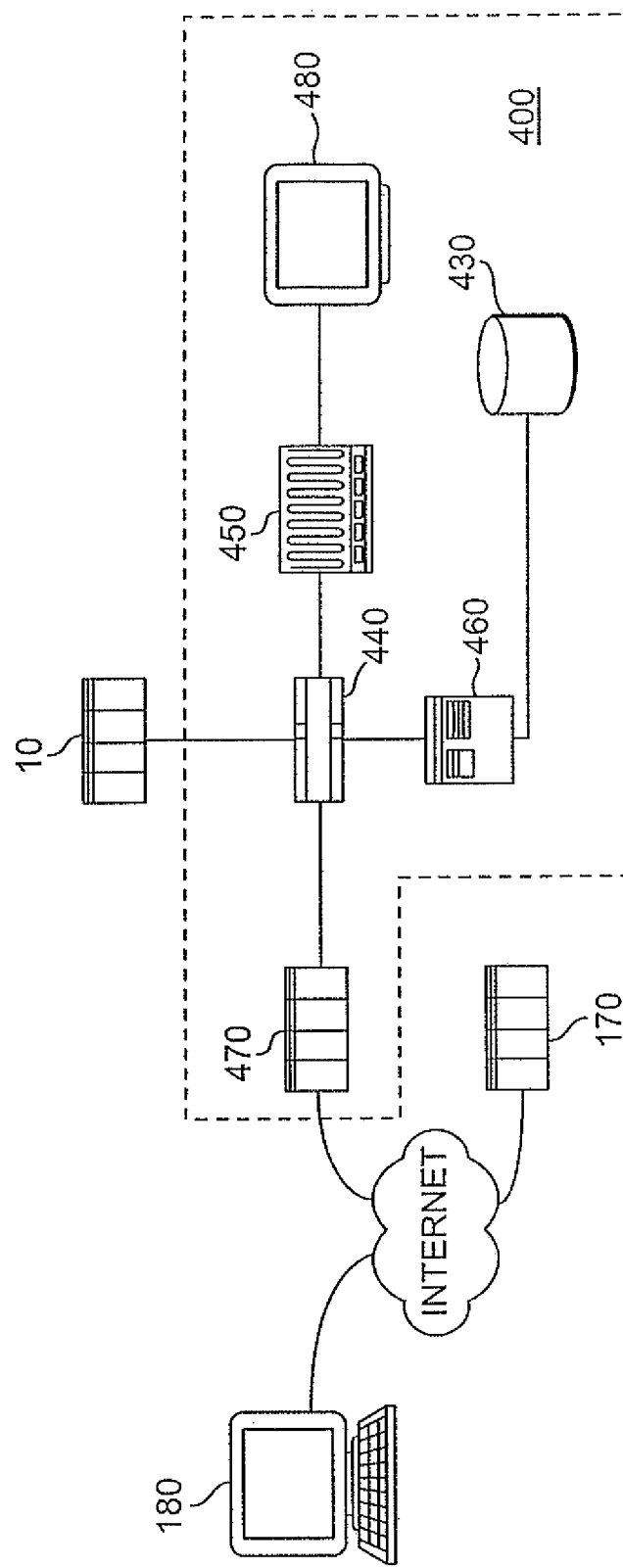
FIG. 7 is an exemplary block diagram of the system architecture in accordance with a second embodiment of the present invention.

With reference to FIG. 7, in which like reference characters refer to like elements, a system architecture for delivering content to an audience member across a plurality of digital mediums according to one embodiment of the present invention is shown. The system includes a digital cable network 400. The digital cable network 400 may include a home television having a uniquely addressable cable set-top box 480 as a means for interfacing the audience member with digital content. The digital cable network 400 may further include a cable head-end 450 for delivering segment targeted content to the set-top box 480. As will be apparent to those of ordinary skill in the art, the head-end 450 may include means for receiving a digital signal, such as, for example, a satellite receiving antennae, from a programming processor 460. The programming processor 460 programs the content to be delivered to the audience member, and provides the appropriate digital signal to the head-end 450. The programming processor 460 may be in communication with a cable company database 430 which may store, for example, subscription data relating to the audience member. The data may include a unique identifier of the audience member within the cable network 400. The programming processor 460 may interface with the system 10 of the present invention through a cable network/Internet bridge 440. As discussed above, the system 10 may include an audience member profile.

The digital cable network 400 may further include a cable company website provided by a web server 470 and accessible by the audience member via the Internet. The audience member may access the website 470 to request a service, such as, for example, ordering a movie, placing a repair order, and changing the level of cable service. The audience member may access the website 470 by providing the audience member's cable network identifier.

The embodiment of the present invention shown in FIG. 7 may be operated as follows for delivering content to an audience member across a plurality of digital mediums. The audience member may visit a website provided by a web server 170. The web server 170 may receive a request for content from the audience member, and provide website pages to an audience member computer 180 in a conventional manner. The website 170 may be owned by, or affiliated with, the owner of the cable network 400 and the website 470. The audience member may visit other sites related to the website 170 within a network. If necessary, a unique audience member identifier related to the website network is assigned to the audience member, and profile data is collected and stored, substantially as described above in connection with FIGS. 3 and 4. The audience member may be associated with an audience segment defined by a set of segment rules substantially as described above in connection with FIG. 5.

The audience member may visit the website 470 to request a service from the cable company, at the same time providing the audience member's unique identifier within the cable network 400. The programming processor 460 may read the audience member's web network identifier, and associate the audience member's cable network identifier with this identifier. The programming processor 460 may then access the system 10 through the bridge 440, and accesses the segment affinity data relating to the particular audience member using the web network identifier. Based on the audience segment affinity data, the programming processor 460 defines the programming rules for the audience segment within the cable network 400. The appropriate digital signal is then sent to the cable head-end 450, and the head-end 450 delivers the audience member targeted content via the set-top box 480 and the audience member's home television. The preferences and behavior of the audience member within the network 400 may also be used to update the member's profile within the system 10. In this manner, the audience member's preference and behavioral data is synchronized across a plurality of mediums into a common profile, and the content delivered to the audience member via those mediums may be customized based upon the characteristics of the profile.

It will be apparent to those skilled in the art that variations and modifications of the present invention can be made without departing from the scope or spirit of the invention.

What is claimed is:

1. A computer implemented method of delivering content from a first digital media server to an audience member computer, and delivering content from a digital medium to an interface with a second digital media server, said method comprising the steps of:
   receiving, from an audience member, a request to access a first digital media server, using an audience member computer;
   receiving, from the audience member, a request to access a second digital media server, using an interface with the second digital media server, wherein the interface with the second digital media server and the audience member computer are separate and distinct devices;
   associating, by the first digital media server, use by the audience member of the audience member computer with a unique first digital identifier;
   associating, by the second digital media server, use by the audience member of the interface with the second digital media server with a unique second digital identifier;
   collecting, by the first digital media server and the second digital media server, profile data of the audience member;
   storing the collected profile data in a database associated with the first digital media server and the second digital media server;
   associating, by the first digital media server and the second digital media server, the stored profile data with the unique first digital identifier and the unique second digital identifier in the database;
   associating the unique first digital identifier and the unique second digital identifier with a segment of audience member computers based on the profile data;
   transmitting first content to the audience member computer via the first digital media server based on the association of the unique first digital identifier with the segment of audience member computers;
   transmitting second content to the interface with the second digital media server based on the association of the unique second digital identifier with the segment of audience member computers; and
   displaying the first content and the second content for the audience member.

2. The method of claim 1, wherein the first digital media server and the second digital media server each comprise a digital media server having a uniquely addressable interface.

3. The method of claim 1, wherein the first digital media server comprises a web server storing a web page of a website, and the digital medium comprises a digital media server selected from the group consisting of: a cable system, a wireless communications system, and a non-web based medium.

4. The method of claim 1, wherein the first digital media server comprises a web server storing a web page of a website, and the second digital media server comprises a digital cable system.

5. The method of claim 1, further comprising:
   associating the unique first digital identifier with the unique second digital identifier upon the audience member requesting a web page of a website associated with the second digital media server.

6. The method of claim 5, further comprising the step of:
   receiving, from the audience member via the web page of the website associated with the second digital media server, a request to at least one of order a movie, place a repair or service order, or change a level of service of the second digital media server.

7. The method of claim 1, further comprising the steps of:
   identifying, by one or more servers, the segment of audience member computers and interface with the second digital media server with a segment identifier included in a segment-targeting cookie;
   storing the segment-targeting cookie in a memory associated with the audience member computer; and
   transmitting content to the audience member computer based on the segment identifier.

8. The method of claim 1, wherein the first digital media server delivers a request for a first web page of a website from the audience member computer, and wherein the step of associating use by the audience member of the audience member computer and the interface with a segment of audience member computers based on the profile data comprises the steps of:
   storing a cookie associated with the first web page of the website in a memory associated with the audience member computer;
   identifying the unique first digital identifier for the audience member computer in the cookie; and
   associating the audience member computer with the profile data based on the unique first digital identifier.

9. The method of claim 6, further comprising the steps of:
identifying the segment of audience member computers the interface with a segment identifier included in a segment-targeting cookie;
storing the segment-targeting cookie in a memory associated with the audience member computer; and
transmitting content to the audience member computer based on the segment identifier.

10. A computer-implemented method for transmitting content to a computer of a user, and transmitting content via a subscription-based digital media server to an interface with the subscription-based digital media server, said method comprising the steps of:
associating use by the user of the computer with a first unique online identifier;
associating use by the user of the interface with a second unique subscriber identifier, wherein the interface and the computer are separate and distinct devices;
collecting and storing, in a database, profile data from interactions by the user with content transmitted to the computer of the user and interactions by the user with content transmitted via the subscription-based digital media server to the interface with the subscription-based digital media server;
associating the stored profile data with one or both of the first unique online identifier and the second unique subscriber identifier in the database;
associating, based on the profile data, the computer of the user with a segment of audience members having one or more common profile characteristics;
transmitting first content to the computer of the user based on the association of the first unique online identifier with the segment of audience members;
transmitting second content via the subscription-based digital media server to the interface of the user, based on the association of the second unique subscriber identifier with the segment of audience members; and
displaying the first content and the second content for the audience member.

11. The method of claim 10 wherein the step of collecting and storing profile data includes collecting data from two or more sources selected from the group of: a database, a web page of a website requests, advertisement requests, user survey data, direct response data, and search requests.

12. The method of claim 10 wherein the segment of audience members is defined by rules that recognize any common affinity between two or more audience member computers.

13. The method of claim 10 wherein the first content is transmitted to the computer of the user by a server selected from the group of: an advertisement server, an email server, a streaming media server, and a website server.

14. The method of claim 10 wherein the step of: associating the computer of the user with a segment of audience members further comprises the steps of:
comparing the collected and stored profile data of a plurality of client computers; and
forming a segment of audience members based on the comparison of client computer profile data.

15. The method of claim 10, further comprising the steps of:
periodically collecting additional profile data based on the use of the computer by the user; and
periodically identifying additional audience member segments for associating with the computer of the user, based on the periodically collected additional profile data.

16. The method of claim 10, further comprising:
assigning to the computer of the user a domain cookie containing the first unique online identifier for a browser associated with the computer of the user;
identifying the first unique online identifier for the browser in the domain cookie;
accessing the collected and stored profile data for the computer of the user from the database in response to identification of the first unique online identifier for the browser;
transmitting a segment-targeting cookie, which includes a segment identifier for the segment of audience members to the computer of the user, wherein the segment identifier is distinct from the first unique online identifier;
receiving a request for a web page of a website from the computer of the user; and
transmitting content to the computer of the user based on the segment identifier in response to receiving the request for the web page of the website.

17. The method of claim 16 further comprising the steps of:
determining whether a domain cookie with a unique online identifier for the browser is absent;
assigning a second domain cookie containing a unique identifier to the browser in response to determining the domain cookie with the unique online identifier for the browser is absent; and
transmitting the second domain cookie to the computer of the user.

18. The method of claim 17 wherein the computer of the user is associated with a default segment of client computers as a result of transmitting the second domain cookie to the computer of the user.

19. The method of claim 16 further comprising the steps of:
receiving a request from the computer of the user to access a primary web page of a website;
providing the computer of the user with a primary website cookie associated with the primary web page of the website, the primary website cookie having a unique identifier for the computer of the user; and
modifying the domain cookie transmitted to the computer of the user to contain the first unique online identifier for the browser in response to transmission of the primary website cookie to the computer of the user.

20. The method of claim 1, further comprising:
updating the collected profile data based on use by the audience member of the interface; and
transmitting additional first content to the audience member computer via the first digital media server based on use by the audience member of the interface and the association of the unique first digital identifier with the segment of audience member computers.

* * * * *